(12) United States Patent
Yang

(10) Patent No.: US 8,832,945 B2
(45) Date of Patent: Sep. 16, 2014

(54) SAFETY DEVICE FOR SHEARS

(76) Inventor: Ching-Chen Yang, Taichung (TW)

( * ) Notice: Subject to any disclaimer, the term of this patent is extended or adjusted under 35 U.S.C. 154(b) by 139 days.

(21) Appl. No.: 13/517,833

(22) Filed: Jun. 14, 2012

(65) Prior Publication Data
US 2013/0333227 A1 Dec. 19, 2013

(51) Int. Cl.
*B26B 13/16* (2006.01)

(52) U.S. Cl.
USPC .............................. 30/262; 30/254

(58) Field of Classification Search
USPC .............. 30/262; 81/318, 319, 321, 322, 323, 81/324
See application file for complete search history.

(56) References Cited

U.S. PATENT DOCUMENTS

| | | | | | |
|---|---|---|---|---|---|
| 2,189,211 | A | * | 2/1940 | Lind | 30/262 |
| 2,508,790 | A | * | 5/1950 | Herr | 30/181 |
| 3,740,846 | A | * | 6/1973 | Duffy | 30/267 |
| 3,775,846 | A | * | 12/1973 | Johnson | 30/262 |
| 4,031,621 | A | * | 6/1977 | Arlett | 30/262 |
| 4,079,513 | A | * | 3/1978 | Harrison | 30/193 |
| 4,980,975 | A | * | 1/1991 | Hodson | 30/262 |
| 5,699,617 | A | * | 12/1997 | Mock | 30/252 |
| 5,774,991 | A | * | 7/1998 | Shi | 30/262 |
| 6,418,626 | B1 | * | 7/2002 | Jang | 30/262 |
| 6,643,937 | B1 | * | 11/2003 | Wu | 30/262 |
| 8,079,150 | B2 | * | 12/2011 | Huang | 30/254 |
| D671,808 | S | * | 12/2012 | Yang | D8/4 |
| 2004/0000058 | A1 | * | 1/2004 | Shyr | 30/262 |
| 2013/0333227 | A1 | * | 12/2013 | Yang | 30/254 |

FOREIGN PATENT DOCUMENTS

GB 2 030 501 * 4/1980

* cited by examiner

*Primary Examiner* — Hwei C Payer

(57) ABSTRACT

Tin snips includes two cutting blades intersecting each other for cutting and two handles for activating the cutting of the two cutting blades. A safety device is disposed in the tin snips for preventing the two cutting blades from opening. The safety device includes a protrusion extending from an edge of one of the handles, a recess provided in an edge of the handle having the protrusion, and a buckling element connected to the other of the handles. The buckling element includes two movable portions rotatable to cover a position where the two handles are drawn to a closed position, an engaging portion disposed between the two movable portions to cross the protrusion to engage into the recess when the movable portions rotate, and a restricting portion connected between the two movable portions and the engaging portion.

8 Claims, 6 Drawing Sheets

F I G . 1, Prior Art

SAFETY DEVICE FOR SHEARS

BACKGROUND OF THE INVENTION

1. Field of the Invention

The present invention relates to a safety device used in snips or cutters, and in particular to a safety device for tin snips.

2. Description of Prior Art

There are various scissors, clippers and snips used for cutting an article. For example, tin snips are a common scissoring tool.

FIG. 1 shows a conventional tin snips 10 constituted of two cutting blades 11 and two handles 12. The two cutting blades 11 are pivotally connected to each other via a fulcrum shaft 13. Cutting edges of the two cutting blades 11 cooperate with each other to scissor an article such as tin. One end of each handle 12 is combined with a corresponding cutting blade 11. A pivotal shaft 14 connecting the two handles 12 is used as a fulcrum for operation, whereby a user can continuously open or close the two cutting blades 11 to finish scissoring actions.

One of the two handles 12 is pivotally connected with a buckling element 20. An edge of the buckling element 20 is provided with a notch 21. When the buckling element 20 rotates, it buckles to a positioning protrusion 22 formed on the other handle 12. In this way, the two handles 12 can be drawn close to each other to thereby prevent the two cutting blades 11 from opening.

When the tin snips 10 is in use, the buckling element 20 may freely swing to a certain angular position. When a user intends to draw the two handles 12 close after use, the user sometimes finds that the buckling element 20 is located in rear of the positioning protrusion 22. As a result, the user has to rotate the buckling element 20 for almost a full circle so as to make the notch 21 of the buckling element 20 to be engaged with the positioning post 22, which is inconvenient in use.

Therefore, it is an important issue for the present Inventor to solve the problem of prior art and to operate the tin snips conveniently and safely.

SUMMARY OF THE INVENTION

In view of the above, the present Inventor proposes a safety device for tin snips based on his expert experiences and deliberate researches in order to solve the problems in prior art.

The primary objective of the present invention is to provide a safety device for tin snips, in which blocking means and guiding means are used to restrict the rotation range of the buckling element and to protect the buckling element from suffering damage or being clipped by the two closing handles. In this way, the safety in use and the protection of the buckling element can be both achieved.

In order to achieve the above objective, the present invention provides a safety device for tin snips. The tin snips has two cutting blades intersecting with each other for snipping and two handles for activating the snipping of the two cutting blades. Further, a safety device is provided in the tin snips for preventing the two cutting blades from opening.

The safety device includes a protrusion protruding from an edge of one of the handles, a recess formed on the edge of the handle having the protrusion, and a buckling element connected to the other handle.

The buckling element comprises two movable portions rotatable to cover a position wherein the two closing handles are drawn close, an engaging portion positioned between the two movable portions to cross the protrusion to be engages into the recess when the movable portions rotate, a restricting portion connected between the two movable portions and the engaging portion, and an elastic portion connected between the two movable portions and juxtaposed aside the restricting portion. An outer surface of the elastic portion is formed with an abutting block.

The two movable portions are formed with an operating piece respectively for actuating the rotation of the buckling element. The two movable portions are formed with a short post respectively, and these two short posts are inserted into holes of the handles respectively. An end surface of each of the short posts is formed with an inclined surface for guiding the movable portion to spread outwardly.

By this arrangement, the protruding short post is used as a rotation shaft, so that the buckling element can rotate (or swing) relative to the handle. The elastic portion (or the abutting block) between the two movable portions is used to restrict the swinging angle of the buckling element. Further, the protrusion is brought into contact with the restricting portion (or even the engaging portion) to guide the buckling element to swing, so that the engaging portion can cross the protrusion to be smoothly engaged into the recess. In this way, the buckling element can be prevented from suffering damage or being clipped by the two closing handles. Thus, the safety in use and the protection of the buckling element can be both achieved.

The above objectives and structural and functional features of the present invention will be described in more detail with reference to preferred embodiment thereof shown in the accompanying drawings

DETAILED DESCRIPTION OF THE INVENTION

Figure 1:
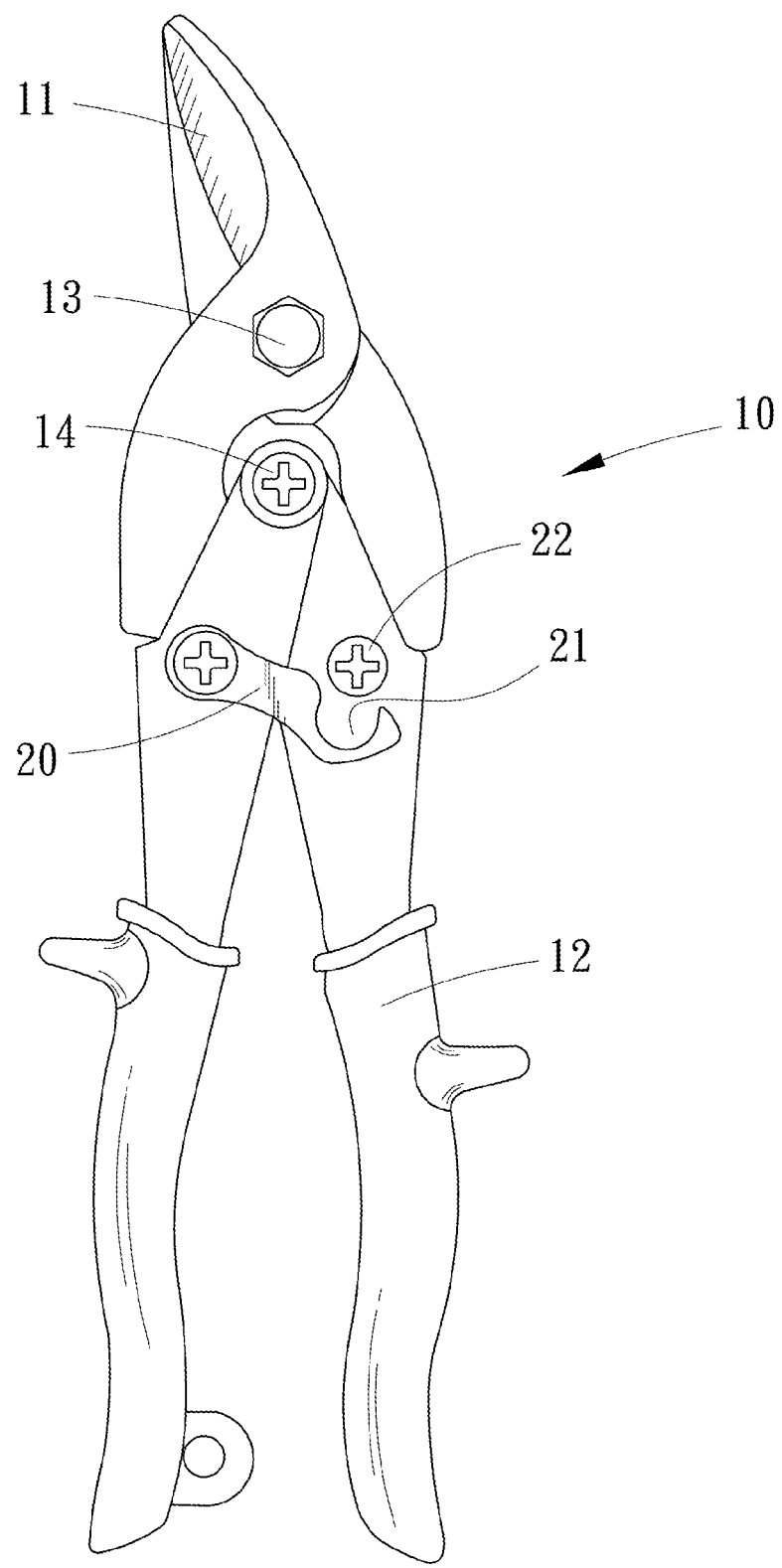
FIG. 1 is a plan view showing the structure of a conventional tin snips.
Figures 2, 3:
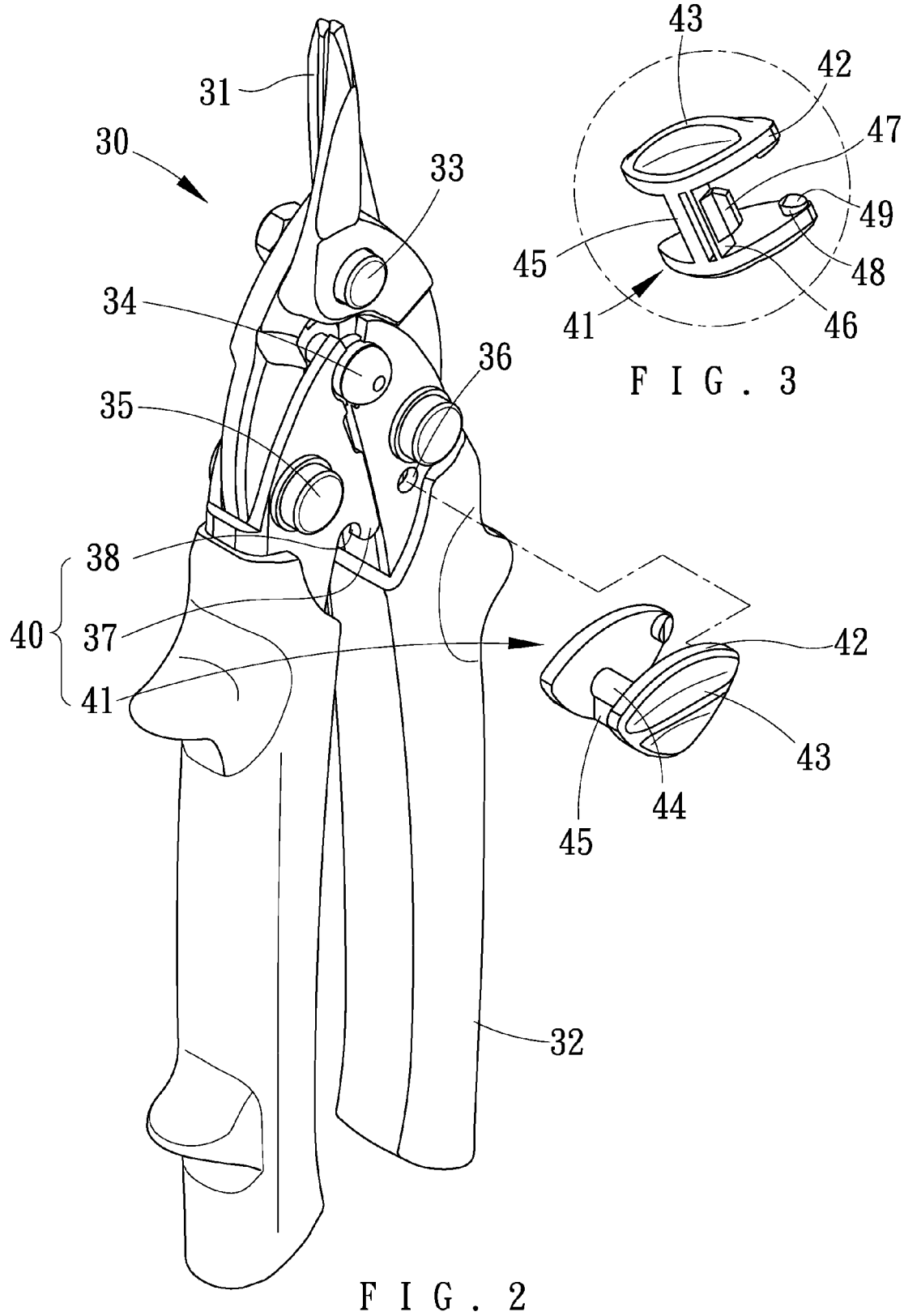
FIGS. 2 and 3 are perspective views showing the structure of the safety device for tin snips according to a preferred embodiment of the present invention.

Please refer to FIGS. 2 and 3 showing the constituent elements of a tin snips 30. A fulcrum shaft 33 penetrates two overlapped cutting blades 31. A tail end of each cutting blade 31 is connected to a handle 32 via a fastening element 35. A user operates the two handles 32 to drive the leading ends of the two cutting blades 31 to open or snip an article such as tin.

Each of the two handles 32 has a C-shaped cross section. An end of each handle 32 near the fulcrum shaft 33 is connected to a pivotal shaft 34, so that the other ends of the two handles 32 can close or open by using the pivotal shaft 34 as a center of rotation. When the two handles 32 are drawn close, the user can use a safety device 40 to prevent the two handles 32 (or two cutting blades 31) from opening. In this way, the personal safety and the safety in using the tin snips can be protected.

An edge of one of the two handles 32 is formed into a recess 38 like a notch, while a corner of this handle 32 adjacent to the other handle 32 is formed with a protrusion 37. The other handle 32 is provided with a hole 36 adjacent to the fastening element 35. The hole 36 allows the buckling element 41 to be pivotally connected therein. The hole 36, the protrusion 37 and the recess 38 constitute the safety device 40 of the embodiment of the invention.

The buckling element 41 has two movable portions 42 each like an isosceles triangle. A surface of the movable portion facing to the outside is formed with a curved operating piece 43 for sustaining an external force to rotate the buckling element 41. Another surface of the movable portion 42 facing to each other is used as an inner surface. Between the inner surfaces of the two movable portions 42, an engaging portion 44, a restricting portion 45, and an elastic portion 46 are combined with the two movable portions 42 to form one body. Two corners of the movable portion 42 are provided with a short post 48 respectively. An end surface of each short post 48 is formed with an inclined surface 49 for guiding the corresponding movable portion 42 to spread outwardly until the two short posts 48 are inserted into the holes 36. By using the short post 48 as a center of rotation, the buckling element 41 can swing relative to the handles 32.

The restricting portion 45 extends from the periphery of the engaging portion 44 to a vertex corner of the movable portion 42. One side of the restricting portion 45 is located aside the elastic portion 46 with a small interval. A surface of the elastic portion 46 facing the restricting portion 45 is viewed as an inner surface, while the other surface of the elastic portion 46 is formed with an abutting block 47 having a trapezoid shape.

Figure 4:
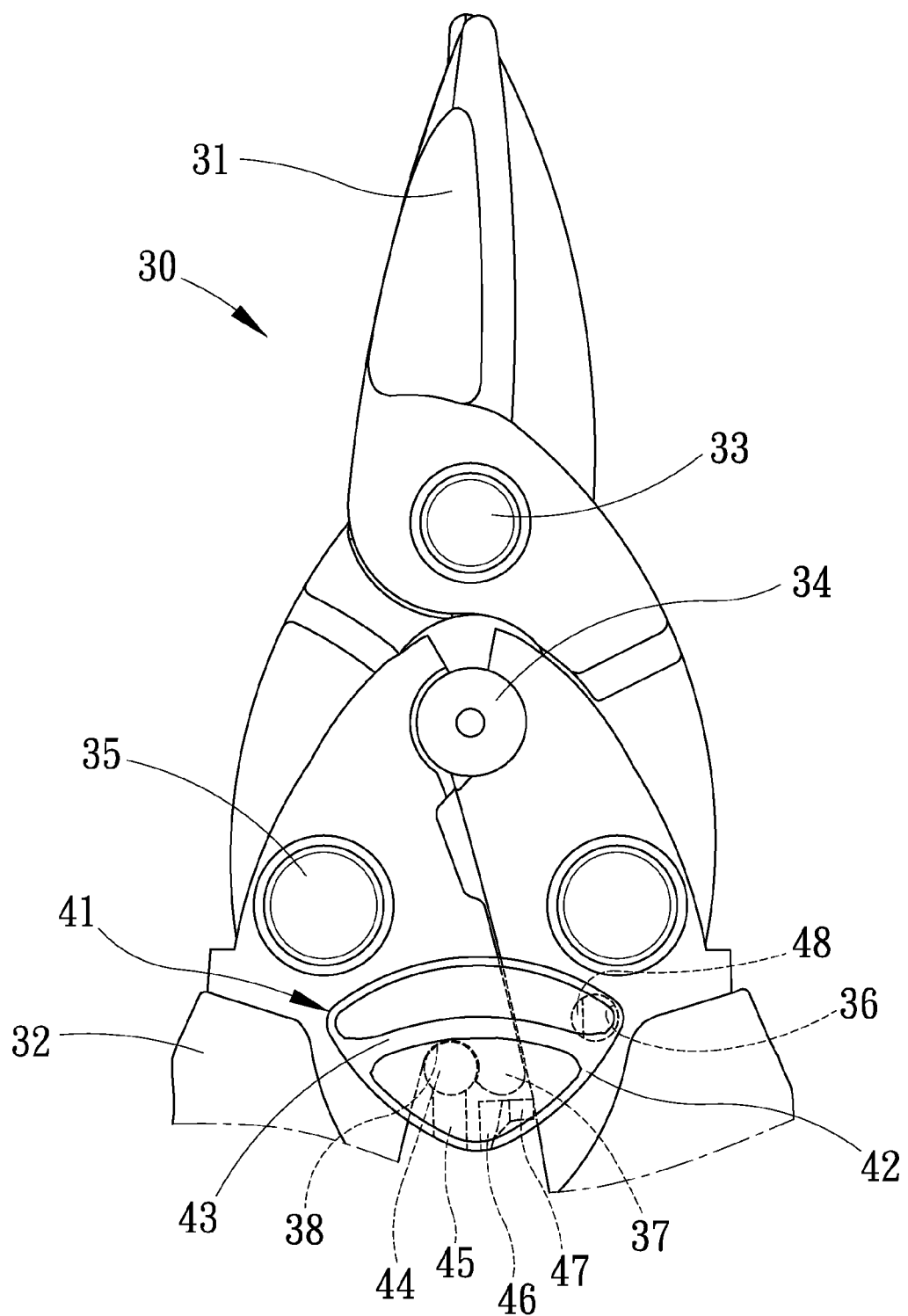
FIG. 4 and FIG. 5 are a plan view and a perspective view respectively showing a state that the safety device of the present invention prevents the two handles from opening.
Figure 5:
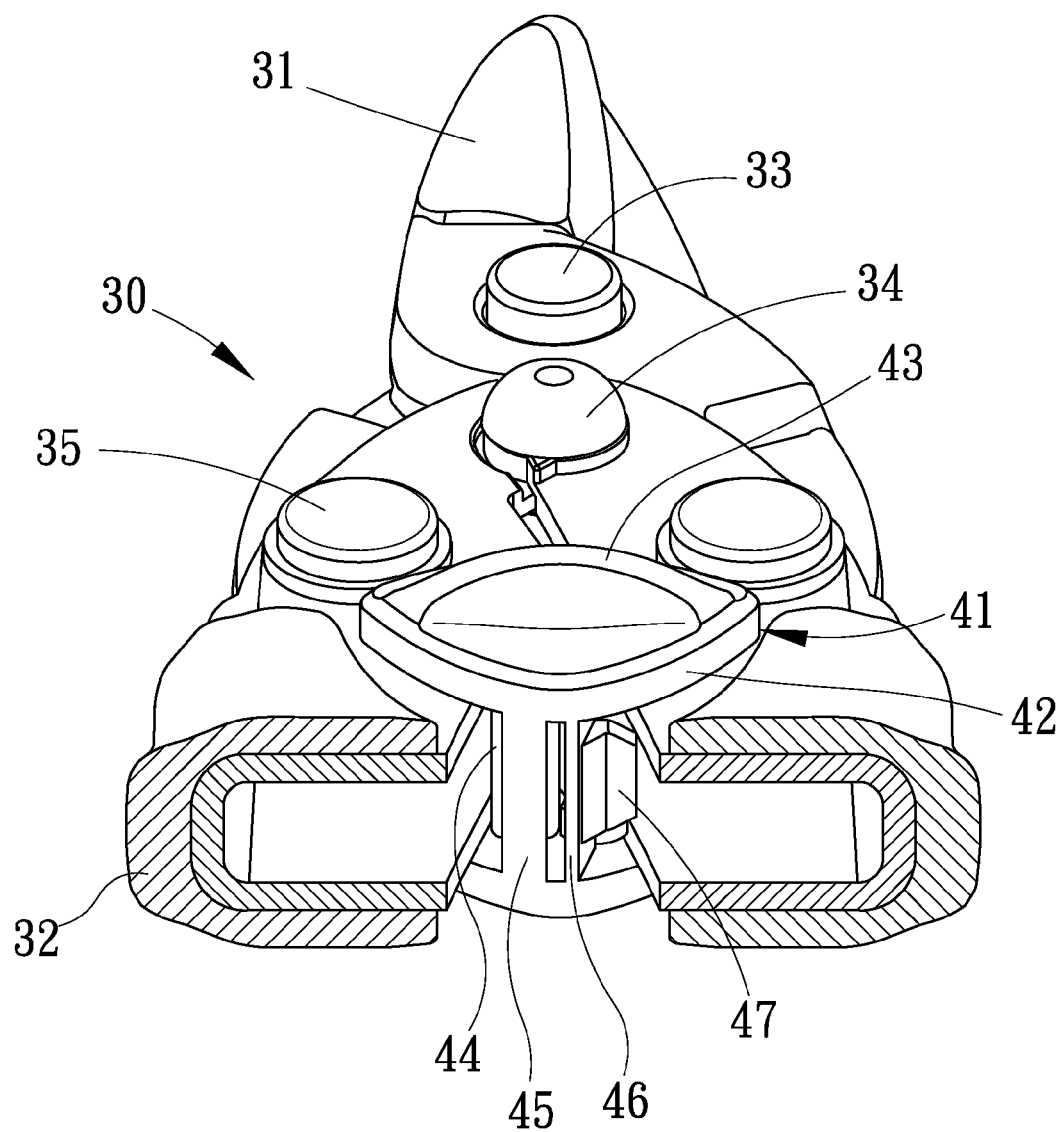

Next, please refer to FIG. 4. An external force is exerted onto the operating piece 43, so that the buckling element 41 rotates around the short post 48 until the movable portions 42 cover the position where the two handles 32 are drawn close to each other. At the same time, the cylindrical engaging portion 44 will cross the protrusion 37 to come to a small-diameter opening of the recess 38. After being pressed by an external force, the engaging portion 44 is engaged into a large-diameter inner space of the recess 38, thereby restricting the two handles 32 from opening. At this time, as shown in FIG. 5, the restricting portion 45 and the elastic portion 46 are exactly disposed between the two handles 32, and the abutting block 47 is located away from an opening formed in the middle section of the handle 32.

Figure 6:
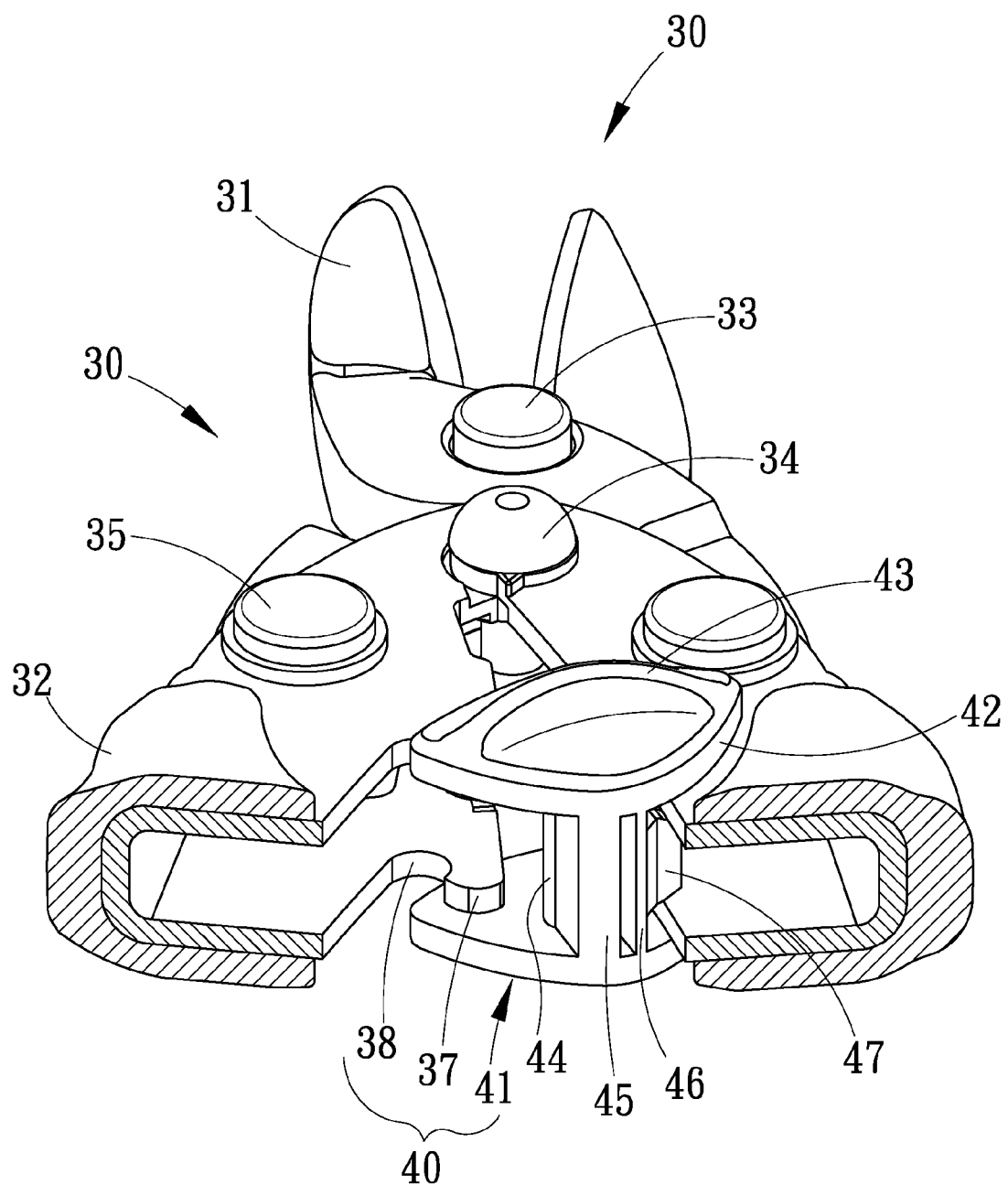
FIG. 6 is a perspective view showing a state that the two handles are not restricted by the safety device of the present invention.

In FIG. 6, after the buckling element 41 is turned by the user to swing, the engaging portion 44 is removed from the opening of the recess 38. Thus, the protrusion 37 is not restricted by the engaging portion 44 any more. As a result, the two handles 32 can open outwardly again by using the pivotal shaft 34 as a center of rotation. Then, the two cutting blades 31 are opened synchronously and ready for snipping.

It should be noted that, the abutting block 47 is partially inserted into the opening formed on the middle section of the handle 32. Both inclined sides of the abutting block 47 abut against upper and lower edges of the opening formed on the middle section of the handle 32 respectively, thereby preventing the buckling element 41 from abutting against the middle section of the handle 32. Even though the buckling element 41 swings toward the middle section of the handle 32 by an external force, the abutting block 47 will be pressed to deform the elastic portion 46. Once the external force is removed, the elastic recovering force of the elastic portion 46 will make the buckling element 41 to move back to the pivotal shaft 34.

Figure 7:
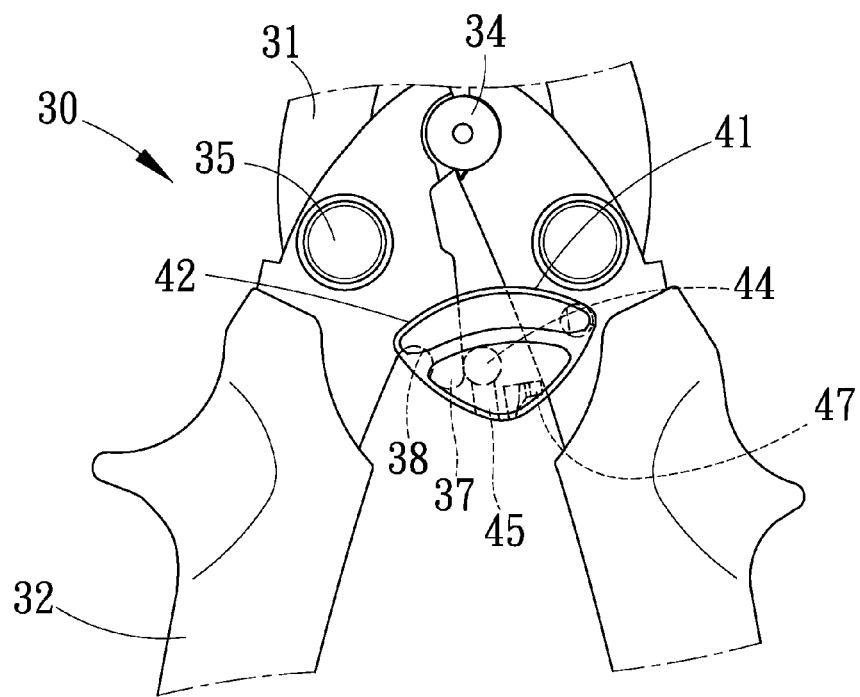
FIGS. 7 and 8 are plan views respectively showing a state that the engaging portion or the restricting portion swing aside the protrusion.

Please refer to FIG. 7 again. When the two handles 32 are pulled open, the engaging portion 44 may move to one side of the protrusion 37 accompanying the swing of the buckling element 41. If the two handles 32 are drawn close, the curved edge of the protrusion 37 squeezes out the cylindrical engaging portion 44, thereby preventing the buckling element 41 from suffering damage or being clipped by the closing handles 32.

Figure 8:
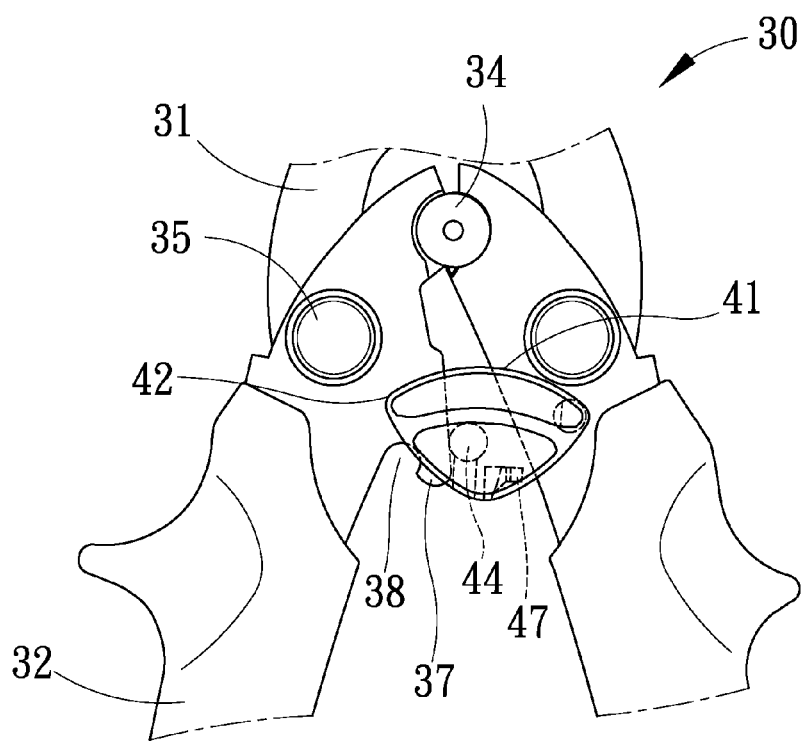

Finally, as shown in FIG. 8, when the two handles 32 are pulled open, the restricting portion 45 may also move to one side of the protrusion 37 accompanying with the swing of the buckling element 41. Then, the restricting portion 45 is supported by the two movable portions 42 to prevent the two handles 32 from being drawn close. In this way, the buckling element 41 can be prevented from suffering damage or being clipped by the handles 32.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A cutting device having a safety device, the cutting device including two cutting blades intersecting each other for cutting and two handles for activating the cutting of the two cutting blades, the safety device being coupled to the cutting device for preventing the two cutting blades from opening, characterized in that the safety device includes:
   a protrusion protruding from an edge of one of the two handles;
   a recess provided in an edge of the handle having the protrusion; and
   a buckling element connected to the other of the two handles and comprising:
      two movable portions rotatable to cover a position where the two handles are drawn to a closed position;
      an engaging portion disposed between the two movable portions to cross the protrusion to be engaged into the recess when the movable portions rotate; and
      a restricting portion connected between the two movable portions and the engaging portion.

2. The cutting device according to claim 1, wherein the buckling element comprises an elastic portion connected between the two movable portions and juxtaposed aside the restricting portion, an outer surface of the elastic portion being formed with an abutting block.

3. The cutting device according to claim 1, wherein each of the movable portions is formed with an operating piece for for accepting a force for rotating the buckling element.

4. The cutting device according to claim 3, wherein at least one of the movable portions is formed with a post, the post being insertable into a corresponding hole in at least one the handles, respectively.

5. The cutting device according to claim 4, wherein an end surface of the post is formed with an inclined surface for guiding the movable portion having the post to spread outwardly.

6. The cutting device according to claim 2, wherein each of the movable portions is formed with an operating piece for accepting a force for rotating the buckling element.

7. The cutting device according to claim 6, wherein at least one of the movable portions is formed with a post, the post being insertable into a corresponding hole in at least one the handles, respectively.

8. The cutting device according to claim 7, wherein an end surface of the post is formed with an inclined surface for guiding the movable portion having the post to spread outwardly.

* * * * *